Sept. 18, 1951     F. W. SULLIVAN, JR     2,568,569
PREPARATION OF COPPER PHTHALOCYANINE
Filed June 2, 1948
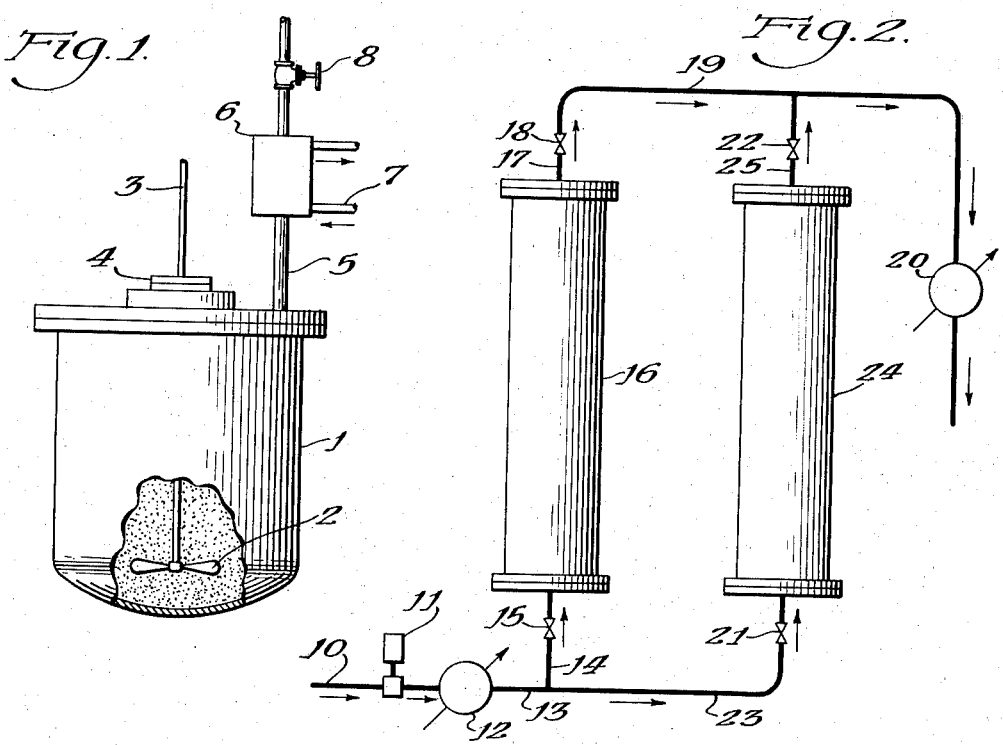
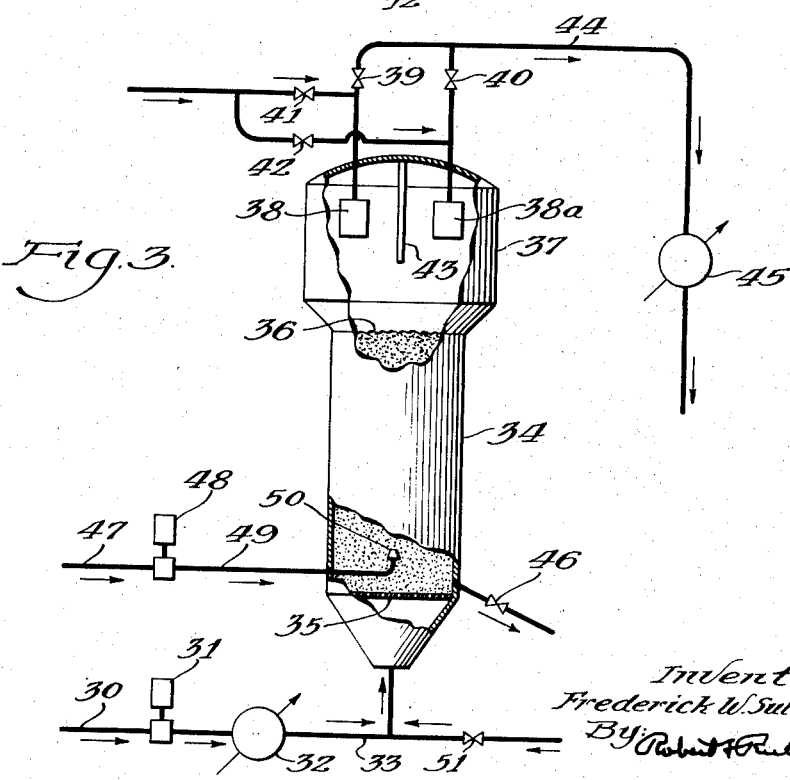
Inventor:
Frederick W. Sullivan, Jr.
By
Agent Patented Sept. 18, 1951

2,568,569

UNITED STATES PATENT OFFICE 2,568,569

PREPARATION OF COPPER PHTHALOCYANINE

Frederick W. Sullivan, Jr., Madison, N. J., assignor to The Standard Ultramarine Company, Huntington, W. Va., a corporation of West Virginia Application June 2, 1948, Serial No. 30,718

22 Claims. (Cl. 260—314.5)

This invention relates to the preparation of porphyrazine derivatives. More particularly, this invention relates to the preparation of tetra-condensed porphyrazines and derivatives thereof.

The preparation and properties of porphyrazine derivatives, especially tetra-condensed porphyrazines and their derivatives is well known to those skilled in the art. For example, tetrabenzo porphyrazine (tetrabenzo tetraazaporphin, phthalocyanine) is a greenish-blue pigment, insoluble in most solvents and exhibiting outstanding stability to such diverse influences as heat, acids, alkalies, oxidizing agents and reducing agents. The copper derivative of phthalocyanine (copper phthalocyanine, phthalocyanine blue) is a brilliant blue pigment showing all the excellent properties of the metal-free parent compound, in some instances (e. g. stability towards acids), to an enhanced degree. If fourteen to sixteen of the sixteen hydrogen atoms on the four benzo groups of copper phthalocyanine are replaced with chlorine, a green pigment results (chlorinated copper phthalocyanine, phthalocyanine green), exhibiting all of the outstanding properties of copper phthalocyanine itself.

Copper phthalocyanine may be prepared by a variety of methods. In fact, because of the surprisingly great stability of the sixteen-membered porphyrazine ring, a great number of materials can be converted to this configuration under a wide range of reaction conditions. However, only three preparative methods have been used commercially.

A. Phthalonitrile, when heated with finely divided copper powder, gives copper phthalocyanine. This preparative method has many disadvantages. Phthalonitrile is rather difficult to prepare and accordingly is quite expensive. Additionally, this intermediate is unstable, polymerizing rather rapidly at the copper phthalocyanine forming temperature. Furthermore, this dinitrile sublimes at the reaction temperature which causes operating difficulties. Most important, the phthalonitrile-copper reaction is strongly exothermic and heat dissipation is difficult since the reaction mixture is an extremely thick mass with poor heat transfer characteristics.

B. Phthalonitrile, when heated with cuprous chloride, produces copper phthalocyanine, provided a rather large excess of the copper salt is used. If the theoretical amount or only a small excess of cuprous chloride is employed, the reaction product is a mixture of copper phthalocyanine and monochloro copper phthalocyanine, this mixture being slightly greener in shade than pure copper phthalocyanine. Obviously, this method suffers from all of the disadvantages discussed in connection with method A.

C. Phthalic anhydride, urea and cupric chloride are fused together, usually in the presence of a catalyst, to form copper phthalocyanine. It is probable that biuret or a similar thermal decomposition product of urea is the actual nitrogen supplying agent in this reaction since copper phthalocyanine is also obtained if the urea is replaced with the crude reaction mixture obtained by heating urea (containing biuret, cyanuric acid, ammelide and the like) or with pure biuret isolated from this crude reaction mixture. Obviously, this preparative method obviates most of the difficulties discussed in connection with the methods described previously. Phthalic anhydride, while moderately expensive, is much less expensive than phthalonitrile which is not unexpected in view of the fact that the dicyanide is usually prepared from the anhydride. Phthalic anhydride is very stable but does give trouble due to its tendency to sublime. The reaction is approximately neutral thermally. While the conversion of phthalonitrile to copper phthalocyanine is strongly exothermic, the conversion of phthalic anhydride to phthalonitrile is strongly endothermic so that on going directly from phthalic anhydride to copper phthalocyanine an approximately thermally neutral reaction results.

The crude phthalocyanine blue reaction mass, prepared as above described or otherwise, does not exhibit any great tinctorial power until it has been conditioned. One suitable conditioning procedure involves solution of the crude pigment mass in about ten parts sulfuric acid followed by pouring onto sufficient crushed ice to give a final slurry containing in the neighborhood of 15% acid. The pigment is separated from the slurry and the resulting pigment paste is washed and may then be laked as usual. Or, if desired, the pigment may be flushed or may be dried, preferably subsequent to adsorption of suitable dispersing aids or grinding aids on the surface of the pigment particles. The resulting dried pigment can be readily dispersed in aqueous media or is readily wetted by and ground into non-aqueous media, such as siccative oils, depending upon the nature of the surface treatment prior to drying.

Phthalocyanine green is best prepared by the high temperature chlorination of copper phthalocyanine which is preferably dissolved or suspended in a suitable vehicle. The crude chlorination product must be conditioned as previously described to secure full development of its inherent tinctorial power.

Phthalocyanine itself is usually prepared by demetallizing a metal derivative. This is conveniently accomplished by treating suitable metal phthalocyanines (e. g. disodium, magnesium, lead, stannous) with acid. Disodium phthalocyanine may be demetallized by treatment with methanol, in which case the phthalocyanine is obtained of such small particle size as to obviate the necessity for conditioning the material as previously described.

I have discovered that copper phthalocyanine may be economically and conveniently prepared by the interaction of an ortho dihalo benzene or its equivalent with cuprous cyanide or a mixture of a metal cyanide and metallic copper. Among dihalo benzenes suitable for the purposes of my invention may be mentioned o-dichlorobenzene, o-dibromobenzene and o-bromoiodobenzene. Mixtures of cyanides containing cuprous cyanide may be employed in place of straight cuprous cyanide. Also, complex cyanides containing cuprous cyanide as a constituent may be substituted for the cuprous cyanide. Metal cyanide-metallic copper mixtures such as sodium cyanide or potassium cyanide and metallic copper may be used. Cuprous cyanide and metallic copper is particularly effective for the purposes of this invention.

If desired, the inorganic reactant may be supported on an inert or reactive solid. Among suitable inactive supports may be mentioned silica in its several forms such as sand, diatomaceous earth, silica gel and the like; calcined alumina, et cetera. Reactive supports include such materials as metallic copper, cuprous oxide, cupric oxide, cuprous sulfide and the like.

The o-dihalo benzenes may be contacted with the inorganic reactant by any convenient method. For example, the inorganic reactant may be added to the organic component and the resulting slurry may be heated, preferably with stirring. If a reaction temperature higher than the boiling point of the organic reactant is desired, the reaction may be conducted under superatmospheric pressure. Or, the organic reactant may be vaporized and the resulting vapors passed through a bed of the inorganic material in particulate form. By operating in this manner, any desired reaction temperature may be employed without resorting to pressure operations by suitably preheating the organic vapors and/or adding the proper amount of heat to the inorganic bed. The reaction is run most conveniently under fluidized conditions wherein the organic vapors are passed upwardly through a bed of the inorganic reactant in finely divided particulate form at such a velocity as to cause the bed to assume a highly turbulent pseudo-liquid state.

While my invention is primarily concerned with the preparation of copper phthalocyanine by the procedures presented above in broad outline, if desired, valuable organic intermediates may be made by suitable modifications of my invention. For example, aryl mononitriles or meta or para aryl dinitriles may be produced by substituting appropriate organic reactants for the o-dihalo benzenes previously specified. Thus, chloro-, bromo- and iodobenzene give benzonitrile when processed in accordance with the teachings of this invention. Similarly, mononitriles of substituted aryls, condensed aryls, or substituted condensed aryls may be made by starting with the appropriate halogen derivative. Furthermore, by employing meta or para dihalo aryls, isomeric with the ortho dihalo aryls mentioned previously, meta or para aryl dinitriles may be prepared. For example, meta dihalobenzenes and para dihalobenzenes produce isophthalonitrile and terephthalonitrile respectively.

The principal object of my invention is to provide methods and means for the preparation of copper phthalocyanine that are more economical and more convenient than those hitherto employed in the art.

Other objects of my invention will become manifest as the description thereof proceeds.

For the better understanding of my invention reference may be had to the accompanying sheet of drawings wherein:

Figure 1 is a diagrammatic representation of one form of apparatus suitable for accomplishing the objects of my invention when operating in the liquid phase.

Figure 2 is a diagrammatic representation of another form of apparatus suitable for accomplishing the objects of my invention when operating in the vapor phase or the liquid phase.

Figure 3 is a diagrammatic representation of a third form of apparatus suitable for accomplishing the objects of my invention when operating in the vapor phase.

Turning now to a more detailed consideration of the figures, in Figure 1 reference character 1 designates a reaction vessel preferably capable of operating under moderate superatmospheric pressure and which can be heated by any suitable means (not shown) such as by internal heating coils or by contact of the external surface of the vessel with heated fluids. Vessel 1 is preferably provided with an agitator 2 mounted on shaft 3 passing through gland 4, the shaft being rotated by any suitable means (not shown). Vessel 1 is preferably provided with a vapor line 5 leading to condenser 6, the surfaces of which may be cooled by any suitable means, for example, by the use of water added through line 7. When operating under superatmospheric pressure, valve 8 may be partially or completely closed in order to maintain the desired pressure in vessel 1.

It is to be understood that Figure 1 is diagrammatic only, many desirable or necessary adjuncts, such as charging and discharging ports, pressure gages, thermometer wells, safety discs and the like being omitted for purposes of simplicity.

The following examples are illustrative of procedures followed and results obtained when preparing copper phthalocyanine in accordance with this invention and utilizing the apparatus of Figure 1.

*Example 1.*—One hundred parts of o-dibromobenzene were brought to a boil in the reaction vessel. An aqueous solution containing 6.05 parts potassium cuprous cyanide was added gradually to the boiling organic liquid. The evolved vapors were removed from the reaction vessel, totally condensed and separated, the organic layer being returned to the reaction vessel either continuously or intermittently at frequent intervals. After all of the complex cyanide solution had been added, boiling, vapor condensation, condensate separation and return was continued as previously described until no more water was evolved following which the reaction vessel was put under total reflux and maintained at the boiling temperature (about 220°) for four hours. At the conclusion of the reaction period, solids were separated, dissolved in concentrated sulfuric acid and precipitated by adding to a large volume of crushed ice and water. The resulting solid was the desired product. The dilute sulfuric acid liquor was partially neutralized to an acidity of about 0.25 normal and then treated with hydrogen sulfide. The precipitate was washed and dissolved in a solution of potassium cyanide to form the complex potassium copper cyanide which is employed in the following run after addition of the necessary amount of complex to replace that consumed in the previous reaction.

*Example 2.*—Similar to Example 1, except that the solid reaction product, prior to solution in sulfuric acid, was leached with a potassium cyanide solution. Undissolved material was separated, washed and conditioned as before. The leach liquor was analyzed and sufficient cuprous cyanide was added to form potassium cuprous cyanide which was employed in the following run as previously described.

*Example 3.*—One hundred parts of o-dichlorobenzene, 11.2 parts of cuprous cyanide and 1.1 parts cuprous bromide were stirred and brought to a temperature of 250°, the reaction pressure being about 75 pounds per square inch. At the end of eight hours the reaction mixture was worked up as described in Example 2 to obtain the desired pigment. The pigment can be prepared at reflux temperature but due to the low boiling point of o-dichlorobenzene and its comparative stability, the reaction is slow. If desired, it is not necessary to employ autogenously generated pressure to attain the desired reaction temperature but instead reactor 1 may be pressured to the required degree with a gas such as ammonia.

Turning now to a more detailed consideration of Figure 2, the selected organic reactant is supplied through line 10 to pump 11 which forces the organic material through heater 12 wherein it is heated to the desired reaction temperature which is preferably above the boiling point of the reactant under the pressure that prevails. Material from heater 12 passes through lines 13 and 14, valve 15 and enters reactor 16 which contains the selected inorganic component or components in particulate form. If desired, the inorganic reactant or reactants may be mounted upon an inert or reactive solid as previously set forth. Unreacted organic material leaves reactor 16 through line 17 and valve 18 and passes by line 19 to condenser 20 wherein vapors are condensed, the resulting liquid being recycled to line 10 by a suitable line (not shown).

After a predetermined period, passage of the organic reactant through reactor 16 is discontinued and the solids in 16 are removed and processed as previously described or otherwise for recovery of the desired blue pigment. Continuous operations may be achieved by providing two reactors. With such an arrangement, when the reaction in 16 is essentially complete, this element is isolated from the system by closing valves 15 and 18. Valves 21 and 22 are simultaneously opened and the organic reactant passes through lines 13 and 23 and valve 21 to reactor 24 which is provided with a fresh charge of the inorganic reactant or reactants. Unreacted material passes through line 25 and valve 22 to condenser 20. With this arrangement, while reactor 16 is being emptied and recharged with a fresh supply of inorganic reactant or reactants, reaction is occurring in 24, continuous operations being achieved thereby, the reactors being alternated at the requisite intervals.

If desired, continuous operation may also be achieved by modifying the apparatus of Figure 2 to convert the fixed bed to a moving bed reactor. This is easily accomplished by installing solids feeders, for example, star feeders or solids pumps, at the top and bottom of reactor 16. Organic reactant is passed upward through 16 continuously. Simultaneously, inorganic reactant or reactants are added continuously or intermittently at frequent intervals to the top of 16 by means of the solids feeder there provided while reaction product is removed similarly and at an equivalent rate from the bottom of 16 by the solids feeder positioned at that point. Obviously, by this modification, continuous operations are achieved and only one reactor is required. This moving bed technique is well known and has been described in detail many times, for example, in U. S. Patent 2,372,018, issued March 20, 1945.

As has been mentioned, Figure 2 is diagrammatic and many necessary or desirable adjuncts have not been indicated. For example, reactors 16 and 24 are preferably insulated or heat may even be supplied thereto to insure maintenance of the organic reactant in vapor form.

The following examples are illustrative of procedures followed and results obtained when preparing copper phthalocyanine in accordance with this invention and employing the apparatus of Figure 2.

*Example 4.*—Copper gauze was coated with cuprous cyanide by dipping in a molten bath of the compound. The reactor was packed with the resulting coated gauze. o-Dibromobenzene was vaporized and passed through the reactor, the temperature being maintained at 250°. After one hour, the contents of the reactor were processed as described in Example 1 to give the desired copper phthalocyanine.

*Example 5.*—Similar to Example 4 except that o-dichlorobenzene was employed and the reaction temperature was 300°.

*Example 6.*—Copper gauze was dipped in a strong solution of potassium cyanide. After drying, the reactor was packed with the coated gauze and the vapors of o-dibromobenzene were passed through for an hour, the reaction temperature being 275°. Upon processing the solid as described in Example 1, copper phthalocyanine was obtained.

*Example 7.*—o-Dichlorobenzene was passed through a reactor filled with 4–8 mesh particles consisting of 90% cuprous cyanide and 10% cuprous bromide. Temperature was maintained at 300° and passage of the vapors continued for two hours. At the conclusion of the experiment, the solids were worked up as previously described to recover the copper phthalocyanine produced.

*Example 8.*—Pumice (4–8 mesh) was impregnated with a solution of potassium cuprous cyanide following which the water was removed. The reactor was packed with the resulting solid and vapors of o-dichlorobenzene were passed therethrough at 300° for 2 hours. The solids were removed from the reactor and leached with sulfuric acid. On adding the resulting leach liquor to a large volume of cold water the desired pigment was precipitated.

In Figure 3, the inorganic component or components are maintained in fluidized form. The organic reactant is supplied through line 30 and is moved by pump 31 through heater 32 wherein the material is heated and vaporized. The resulting vapors pass by line 33 to the lower portion of reactor 34 which contains the inorganic reactant or reactants in finely divided form. Organic reactant vapors are charged to the reactor at such a rate as to cause the finely divided solids to assume the familiar violently turbulent pseudofluid form. Such a condition is achieved if the superficial linear velocity of the vapors through the reactor 34 is in the approximate range 0.5 to 1.5 feet per second, preferably about 1.0 foot per second. Reactor 34 is preferably provided with one or more distributing grids 35 to facilitate the uniform distribution of vapors over the cross sectional area of reactor 34.

The upper surface of the dense, turbulent, fluidized bed is at an approximate level indicated by 36. Reference character 37 designates a separation zone in which particles blown upward from surface 36 are given an opportunity to settle back upon the fluidized bed, a greater or lesser number remaining suspended in the upwardly passing vapors. These may be separated therefrom by any suitable means, for example, by filtration. The upper portion of the separation zone may be provided with two or more filtering elements 38 and 38a, which may take the form of porous ceramic filters, porous metallic filters or the like. As the vapors pass through the porous membrane of a filtering element, the suspended particles therein are deposited on the upstream side of the filtering surface. For continuous operation it is preferable to employ two or more filtering elements, at least one of which is exercizing the filtering function and at least one other is being blown back at a given instant. Two such elements are shown in Figure 3. With valve 39 open and valve 40 closed, the solids laden vapors pass through 38 and the filtered vapors leave the unit through valve 39. Simultaneously, filter element 38a is being blown back. To accomplish this, valve 41 is closed and valve 42 is opened and a suitable inert gas is passed through 42 and filtering element 38a whereby the layer of solids on the upstream side thereof (from the standpoint of the direction of flow of the reactant vapors) is dislodged into the separation zone, the greater part of the layer falling back to the fluidized bed. If desired, each filtering element may be positioned in an individual compartment defined by baffles exemplified by baffle 43. This discourages the direct passage of solids dislodged during the blow-back operation to filtering elements exercizing the filtering function. Obviously, at frequent intervals, the filters exercizing the filtering function are blown back while those being blown back are returned to the filtering cycle, this being accomplished by the proper manipulation of valves 39, 40, 41 and 42. These valves may, if desired, be opened and closed automatically, the timing and sequence of their operation being regulated by a time cycle controller.

Any gas that is non reactive under the conditions prevailing in settling zone 37 may be used to blow back the filters. If desired, vaporized charge may be employed.

Other means of separation of suspended solids from unreacted vapors may be employed if desired such as cyclone separators or Cottrell precipitators, which may be used individually or in combination. Or, if desired, the solids laden vapors may be passed through a partial condenser wherein a portion of the vapors are condensed. On separation of the liquid formed, this will be found to contain in suspension most of the solids previously present in suspended form in the vapors.

Solids free vapors pass through line 44 to condenser 45, the effluent from this condenser being recycled. At the conclusion of the reaction, the solids in 34 may be withdrawn in fluidized form through the line containing valve 46 and worked up as usual.

If desired, the inorganic component or components of the reaction mixture may be supported on inert or reactive solids. Furthermore, such systems may be prepared in situ by injecting a solution of the inorganic component or components into a heated bed of the supporting solids in fluidized form. For example, reactor 34 may be charged with finely divided sand, copper powder or other desired solid, the selected solid being maintained in fluidized form by passage of a heated gaseous fluid therethrough. A solution of the selected inorganic reactant or reactants is introduced into reactor 34 by line 47, pump 48, line 49 and orifice 50, this last preferably taking the form of an atomizing nozzle. As the solution of the inorganic reactant or reactants, which may be preheated if desired, strikes the fluidized bed of heated solid particles, flash evaporation occurs and the inorganic reactant or reactants is desposited upon said solid particles. When sufficient inorganic reactant or reactants has been introduced in the manner, pump 47 is stopped and organic reactant vapors are introduced as previously described. By operating in this manner, finely divided sand or copper powder may be coated by introducing a solution of an alkali metal copper cyanide which may also contain a copper bromide or copper iodide if desired. A highly reactive fluidized bed may also be prepared by injecting a solution of an alkali metal cyanide, which may also contain, if desired, copper bromide or copper iodide, into a fluidized bed of copper powder.

If desired, continuous production of the desired pigment may be achieved when operating in accordance with the modification just described. A solution of the desired inorganic reactant or reactants (preheated if desired) is continuously introduced into reactor 34 by way of line 47, pump 48, line 49 and orifice 50. Simultaneously, preheated vapors of the organic reactant are introduced through line 33 as previously described, whereby the solids in reactor 34 are heated and maintained in the fluidized condition. Continuously, or intermittently at frequent intervals, fluidized solids are withdrawn through valved line 46 and are worked up as previously described, for obtaining the desired pigment. Fresh solids are added to the reactor, preferably continuously, from a supply hopper (not shown) via valved line 51, these solids being picked up by the vapors of the organic reactant passing through line 33 and are thereby moved into reactor 34.

While only one reactor is shown in Figure 3, two or more such reactors may be provided for alternate use whereby continuous operation is also achieved. Also, while a fluidized bed of solids is shown in Figure 3, suspended solids may be employed if desired. In this modification, sufficient finely divided solids are added to the stream of organic vapors in line 33 to give a non-settling suspension in reactor 34. Filtering elements 38 and 38a are removed so that vapors containing suspended solids may be passed from the reactor following which the solids are separated by methods previously described or otherwise and are worked up to give the desired pigment. In general, this method of operation is not too practical since the time of contact between solids and vapors is usually too short for complete reaction unless extremely large and cumbersome reactors are provided.

As has been mentioned previously in connection with Figures 1 and 2, Figure 3 is highly diagrammatic. Many necessary and desirable adjuncts thereto, well known to those skilled in the art, have been omitted from the figure in the interests of simplicity.

The following examples are illustrative of procedures followed and results obtained when preparing copper phthalocyanine in accordance with this invention and utilizing the apparatus of Figure 3.

*Example 9.*—Reactor 34 was charged with sufficient finely divided cuprous cyanide (95% through 200 mesh) so that on passing the vapors of o-dichlorobenzene therethrough at a superficial lineal velocity of one foot per second, the level of the resulting dense, turbulent, fluidized bed was at the approximate point indicated by reference character 36. Passage of the vapors at the rate specified above was continued for three hours, the temperature of the fluidized bed being maintained at 300°. At the conclusion of the reaction, the fluidized solids were withdrawn and were worked up as described in connection with Example 2 for isolation of the desired pigment.

*Example 10.*—Similar to Example 9, except that the fluidized solids consisted of 90% cuprous cyanide and 10% copper bronze.

*Example 11.*—A mixture of 90% cuprous cyanide and 10% cuprous bromide was ground until practically all passed through a 200 mesh screen. The resulting solids were employed as described in Example 9. Reaction was complete in two hours.

*Example 12.*—Finely divided copper bronze was wet with a solution of potassium cyanide and the resulting paste was dried, following which lumps were disintegrated by passage through a hammer mill. The resulting finely divided solid was fluidized as previously described, o-dibromobenzene vapors at 275° being employed. Reaction was complete in two hours.

*Example 13.*—The solids of Example 12 were employed and were fluidized with the vapors of o-dichlorobenzene at 350°. Reaction was essentially complete in two hours.

*Example 14.*—Finely divided crushed sand (over 95% through 200 mesh) was coated with potassium cuprous cyanide and the product was passed through a hammer mill to disintegrate lumps. This was fluidized by means of the vapors of o-dichlorobenzene heated to 350°. After two hours, the solids were removed and leached with concentrated sulfuric acid. The deep green copper phthalocyanine sulfate solution was poured into sufficient ice and water to give a final acid content of 13.5%. The desired copper phthalocyanine was separated from the resulting slurry. The finely crushed sand, which was of course insoluble in acid, was washed, dried and reused.

*Example 15.*—Similar to Example 14 except that the sand coating consisted of 90% potassium cuprous cyanide and 10% cuprous bromide. Reaction was continued for two hours at 300°.

When employing the apparatus of Figures 2 and 3 it is not essential that pure o-dihalo benzene vapors be passed over or through the solids. The vapors may, if desired, be diluted with gases or vapors having no deleterious effects under the prevailing reaction conditions. Among suitable diluents for the o-dihalo benzenes may be mentioned ammonia, vapors of aliphatic amines, aliphatic and aromatic nitriles, pyridine, quinoline, piperidine and ethanolamine.

While in the previous discussion and examples specific compounds have been mentioned it is to be understood that equivalents thereof may be used. Thus, sodium cyanide and sodium cuprous cyanide may be substituted for the corresponding potassium salts. Cuprous iodide or cupric bromide may be used in place of cuprous bromide.

Equivalents of the o-dihalo benzenes specifically mentioned may be employed. Among these may be mentioned o-halo benzoic acids, o-halo benzamides, o-halo benzene sulfonic acids, o-halo benzonitriles and the like. In some cases, vaporization and/or stability characteristics preclude vapor phase operations (Figures 2 and 3) and require that the reaction be conducted in the liquid phase (Figure 1). In some cases it may be necessary to dissolve the alternate in a solvent such as nitrobenzene, naphthalene, pyridine, quinoline or the like. The proper technique to employ in any specific instance will be obvious to those skilled in the art.

If the desired pigments are to be produced it is obvious that the dihalo benzenes or their equivalents must have the ortho configuration. Para compounds, for example, do not react to form the desired pigment, p-dichlorobenzene giving terephthalonitrile under the reaction conditions here used as has been set forth previously.

Any desired derivatives of copper phthalocyanine may be prepared in accordance with this invention. These include derivatives in which one or more hydrogens on the benzo rings are replaced by such groups as halogens, chloromethyl groups, amino, alkyl amino, aryl amino or alkaryl amino groups, acetoamino groups, azo groups, alkoxy and aryloxy groups, nitro groups, sulfonic acid groups, carboxyl groups, alkoyl and aroyl groups, phenyl groups and the like. These may be prepared by either starting with the appropriately substituted o-dihalo benzene, or equivalent, or by modifying, by known means, the copper phthalocyanine produced.

The benzo groups of copper phthalocyanine may be replaced by other equivalent groups by using appropriate o-dihalo derivatives as starting materials. Thus, by employing 1, 2- or 2, 3- dihalo naphthalenes, 2, 3-dihalo thionaphthenes, 2, 3-dihalo thiophenes and the like, tetracondensed tetra porphyrazine analogs of copper phthalocyanine result.

The copper in the pigment prepared in accordance with this invention may be removed to give phthalocyanine itself or may be replaced by other metals such as the alkali metals, the alkaline earth metals, the iron group metals, magnesium, zinc, cadmium, manganese, lead, copper, mercury, tin (-ous and -ic), aluminum, vanadium and the like by methods well known in the art.

Be it remembered, that while the present invention has been described in connection with certain specific details and certain specific examples thereof, it is to be understood that these are illustrative only and do not limit the spirit or scope of said invention except as these may be incorporated in the appended claims.

I claim:

1. A method of preparing copper phthalocyanine consisting of, interacting an o-dihalo benzene and an alkali metal copper cyanide at an elevated temperature in the range 200° to 450° C.

2. The method of claim 1, further characterized by the fact that said alkali metal copper cyanide is admixed with metallic copper.

3. The method of claim 1, further characterized by the fact that said alkali metal copper cyanide is admixed with a compound selected from tne group consisting of copper bromides and copper iodide.

4. A method of preparing copper phthalocyanine consisting of applying a layer of an alkali metal copper cyanide to a solid in particulate form, contacting an o-dihalo benzene with said coated solid at an elevated temperature in the range 200° to 450° C., leaching the so treated coated solid with sulfuric acid and adding the resulting solution to a large volume of water to precipitate the desired pigment.

5. The method of claim 4, further characterized by the fact that said solid is metallic copper.

6. The method of claim 5, further characterized by the fact that vapors of the o-dihalo benzene are passed upward through a bed of said coated solid at such a velocity as to cause the bed to assume a highly turbulent pseudo-liquid state.

7. The method of claim 6, further characterized by the fact that the o-dihalo benzene is o-dichlorobenzene.

8. The method of claim 4, further characterized by the fact that said alkali metal copper cyanide is admixed with a compound selected from the group consisting of copper bromides and copper iodide.

9. The method of claim 8, further characterized by the fact that vapors of the o-dihalo benzene are passed upward through a bed of said coated solid at such a velocity as to cause the bed to assume a highly turbulent pseudo-liquid state.

10. The method of claim 9, further characterized by the fact that the o-dihalo benzene is o-dichlorobenzene.

11. A method of preparing copper phthalocyanine consisting of injecting an aqueous solution of an alkali metal copper cyanide into a fluidized bed of solids at a temperature above the boiling point of water whereby the solids acquire a layer of said alkali metal copper cyanide, discontinuing injection of the solution and passing vapors of an o-dihalo benzene at an elevated temperature in the range 200° to 450° C. through said coated, fluidized solids, leaching the so treated coated solids with sulfuric acid and adding the resulting solution to a large volume of water to precipitate the desired pigment.

12. The method of claim 11, further characterized by the fact that said solution of an alkali metal copper cyanide contains a compound selected from the group consisting of copper bromides and copper iodide.

13. The method of claim 12, further characterized by the fact that the o-dihalo benzene is o-dichlorobenzene.

14. The method of preparing copper phthalocyanine consisting of injecting an aqueous solution of an alkali metal cyanide into a fluidized bed of metallic copper particles at a temperature above the boiling point of water whereby said particles acquire a layer of said alkali metal cyanide, discontinuing the injection of the solution and passing vapors of an o-dihalo benzene at an elevated temperature in the range 200° to 450° C. through the coated, fluidized solids, leaching the so treated coated solids with sulfuric acid and adding the resulting solution to a large volume of water to precipitate the desired pigment.

15. The method of claim 14, further characterized by the fact that said solution of an alkali metal cyanide contains a compound selected from the group consisting of copper bromides and copper iodide.

16. The method of claim 15, further chacterized by the fact that said o-dihalo benzene is o-dichlorobenzene.

17. A method of preparing copper phthalocyanine consisting of injecting an aqueous solution of an alkali metal copper cyanide into a fluidized bed of solids and passing vapors of an o-dihalo benzene through said fluidized bed of solids at an elevated temperature in the range 200° to 450° C., removing solids from said fluidized bed, leaching said removed solids with sulfuric acid, returning leached solids to the fluidized bed and adding the resulting leach solution to a large volume of water to precipitate the desired pigment.

18. The method of claim 17, further characterized by the fact that said solution of alkali metal copper cyanide contains a compound selected from the group consisting of copper bromides and copper iodide.

19. The method of claim 18, further characterized by the fact that the o-dihalo benzene is o-dichlorobenzene.

20. A method of preparing copper phthalocyanine consisting of injecting an aqueous solution of an alkali metal cyanide into a fluidized bed of metallic copper particles and passing vapors of an o-dihalo benzene through said fluidized bed of metallic copper particles at an elevated temperature in the range 200° to 450° C., removing solid particles from said fluidized bed, leaching said removed solid particles with sulfuric acid, returning the leached solid particles to the fluidized bed and adding the resulting leach solution to a large volume of water to precipitate the desired pigment.

21. The method of claim 20, further characterized by the fact that said solution of an alkali metal cyanide contains a compound selected from the group consisting of copper bromides and copper iodide.

22. The method of claim 21, further characterized by the fact that said o-dihalo benzene is o-dichlorobenzene.

FREDERICK W. SULLIVAN, Jr.

REFERENCES CITED

The following references are of record in the file of this patent:

FOREIGN PATENTS

| Number | Country | Date |
|---|---|---|
| 418,367 | Great Britain | Oct. 22, 1934 |
| 490,744 | Great Britain | Aug. 22, 1938 |
| 498,831 | Great Britain | Jan. 13, 1939 |